May 7, 1929.  G. H. CLARK  1,712,026
RADIO SIGNALING APPARATUS
Filed Jan. 18, 1924
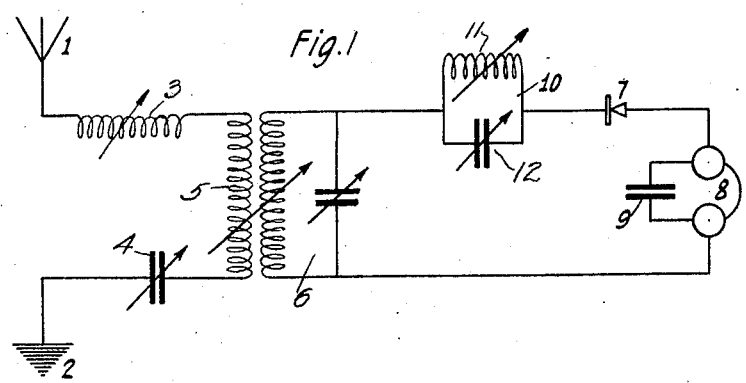
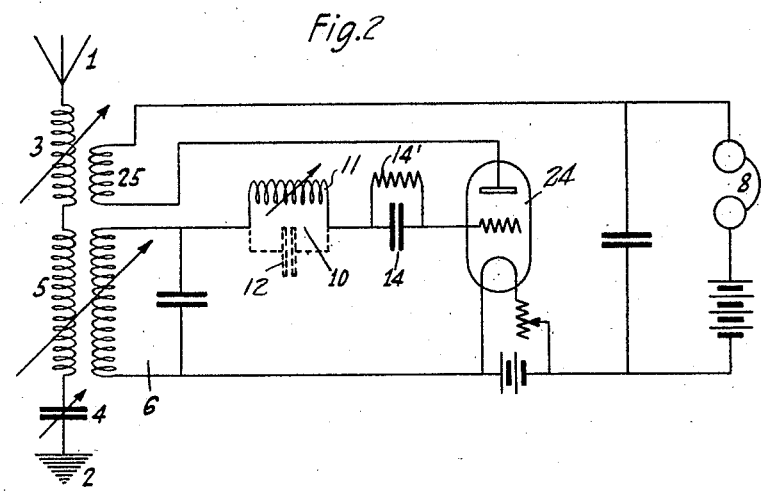
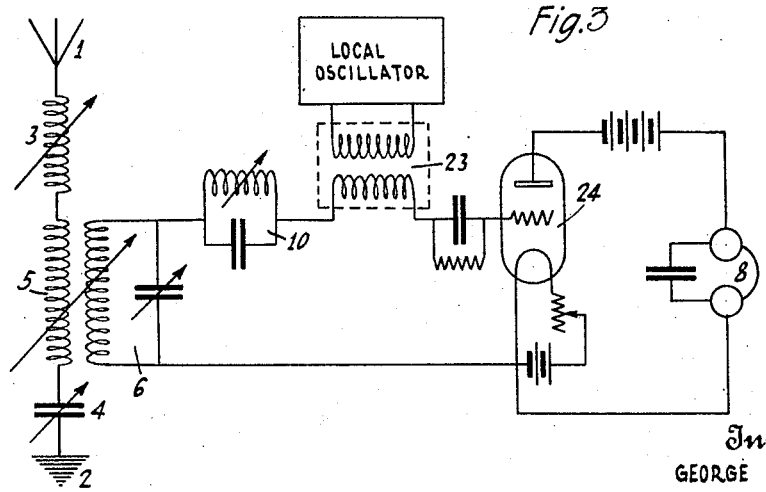
Inventor
GEORGE H. CLARK
By his Attorney Patented May 7, 1929.

1,712,026

UNITED STATES PATENT OFFICE.

GEORGE H. CLARK, OF BROOKLYN, NEW YORK, ASSIGNOR TO RADIO CORPORATION OF AMERICA, A CORPORATION OF DELAWARE.

RADIO SIGNALING APPARATUS.

Application filed January 18, 1924. Serial No. 686,962.

This invention relates particularly to the elimination of interference in receiving radio signals although as will appear hereafter it is useful for a variety of purposes. The difficulties of detecting desired signals through the interference produced by the operation of nearby transmitting stations are well known and numerous arrangements have been suggested for the elimination of such interference. In accordance with one of these arrangements a connection or circuit is utilized which is commonly designated by various terms such as "frequency trap", "rejector circuit" or "loop circuit". Such trap circuits are connected in the receiving circuits and consist of inductance and capacity tuned to the interfering frequency. Currents having a frequency corresponding to that to which the rejector circuit is tuned circulate therein without circulating in the circuit containing the rejector circuit. The rejector circuit offers a path of infinite impedance to the frequency for which it is tuned, but a finite or low impedance to currents of other frequencies. I have found that when the frequency trap or loop circuit is connected in the receiving circuit and tuned to eliminate interference, the tuning of the receiving circuit, however, is materially affected. When the receiving circuit is again adjusted for satisfactory reception the interfering frequency is no longer excluded so that it is difficult to tune out the interference and tune in the desired signal using such circuits.

I have discovered that the suppression of the interfering frequency can be secured without introducing the disadvantages mentioned by including the frequency trap in a non-tuning circuit. The circuit can then function as a rejecting circuit, without affecting the tuning of the receiving circuits. If the frequency trap is placed in a primary or a secondary tuning circuit as has been done heretofore the disadvantages mentioned are introduced.

The novel features which I believe to be characteristic of my invention are particularly set forth in the appended claims, the invention itself, however, both as to its construction and mode of operation, together with further objects and advantages thereof will best be understood by reference to the following description taken in conjunction with the accompanying drawings. The diagrammatic illustrations show by way of example several arrangements embodying the invention. The invention, however, is not necessarily limited thereto as it may be utilized in various ways without departing from the spirit of the invention.

In the drawings:

Fig. 1 is a diagrammatic representation of a simple form of receiving circuit utilizing the invention.

Fig. 2 is a modification in which this invention is used with a regenerative circuit.

Fig. 3 is a diagrammatic representation in which the invention is utilized with heterodyne reception.

In Fig. 1 a simple receiving circuit for damped or modulated waves is shown in which 1 represents diagrammatically an antenna which may be of any of the well known types. The antenna is grounded at 2 and contains tuning elements such as the inductance 3 and condenser 4. In the particular form illustrated the antenna is inductively coupled through coil 5 to the tuned secondary circuit 6. The secondary circuit is connected in a well known manner to a circuit containing a detector or rectifier 7 and a telephone 8 shunted by a condenser 9. I have found that satisfactory operation is not obtained if a rejector circuit tuned to an interfering frequency is connected in the antenna circuit 1, 3, 5, 4, 2 or the secondary circuit 6. These latter as well as other oscillation circuits are included in the term tuning circuits used heretofore.

In general, the tuning circuits are those oscillation circuits which are tuned to the signal, but the term "tuning" is intended to cover detuned as well as tuned circuits. The term is used hereafter in a broad sense to designate all circuits other than those which are not capable of being tuned.

In accordance with the invention a rejector circuit 10 consisting of an inductance 11 and a capacity 12 is connected in the detector circuit instead of in either of the tuning circuits. The inductance and capacity of the rejector circuit are preferably in parallel and of such values as to be tuned to the interfering frequency. The latter, however, is not always essential, as in some instances it is desirable to broadly tune the rejector circuit to eliminate a band of wave lengths. In every instance the rejector or trap circuit must be tuned to a frequency other than the desired signal frequency. The rejector may be an inductance and capacity in parallel, or the effect may be secured by the use of a coil having distributed capacity. In Fig. 2 this has been indicated by showing a coil 11 in full lines and a condenser 12 in dotted lines. A separate condenser and coil are desirable when sharp tuning to a certain interfering frequency is desired, but to eliminate a band of wave lengths, a coil having distributed capacity is preferable. In this illustration the rejector circuit is in a non-tuning portion of the receiving circuit as it is directly in series with the rectifier. Alternating potentials of the frequency for which the rejector circuit is tuned are in effect short circuited in this circuit so that the interfering potential is not impressed on the rectifier.

This arrangement as well as others hereinafter described may be readily adapted for the reception of undamped or continuous waves by utilizing various well known methods such as the heterodyne, chopper, etc. Amplifying circuits may also be added in well known ways.

In the modification shown in Fig. 2, a vacuum tube 24 is used instead of the rectifier 7, shown in Fig. 1. Detection is accomplished by means of a grid condenser 14 and grid leak 14'. The output circuit of the tube is coupled to the tuned input circuit 6 by means of a feed-back coil 25. The rejector circuit is connected as in Fig. 1 between the tuned circuit 6 and the detector.

A somewhat different arrangement utilizing the rejector circuit is shown in Fig. 3. In receiving continuous waves upon the heterodyne principle a local oscillator is utilized to generate an interfering radio frequency to combine with the signal frequency to produce an audible beat frequency. Difficulty is sometimes encountered in preventing transmission of this interfering frequency by the receiving set while retaining the function for which the interfering frequency was originally generated. The local oscillator is coupled by means of a shielded transformer 23 to the grid lead of a three electrode valve 24. The rejector circuit 10 is connected between the tuned secondary 6 and the transformer. The interfering frequency is impressed on the grid so as to produce the desired useful interfering frequency on the grid to give the best effect, but due to the action of the rejector circuit the interfering frequency cannot reach the secondary 6 and therefore cannot be radiated by the antenna which is coupled therewith.

In the several figures of the drawing I have given a number of illustrative circuits embodying the invention for the purpose of showing that it is capable of use quite generally in different types of receiving circuits and even for other purposes than eliminating interference from nearby or distant transmitting stations without departing from the spirit of the invention.

Having described my invention, what I claim is:

1. In combination, a thermionic valve, an input circuit for said valve, an antenna circuit for supplying energy to said input circuit, a local oscillator associated with said input circuit and means arranged in said input circuit so that the oscillations from said local oscillator are not radiated by the antenna.

2. A receiving circuit comprising a thermionic valve, an input circuit for said valve, said input circuit having a tuned portion, a local oscillator coupled to said input circuit and a rejector circuit connected in said input circuit between the tuned portion and the portion coupled to said local oscillator.

3. In combination, a thermionic valve, an input circuit for said valve, a local oscillator coupled to said input circuit, an antenna coupled to said input circuit and a rejector circuit tuned to the frequency of said local oscillator connected in said input circuit between the local oscillator and the antenna coupling to prevent radiation of the local oscillations produced by said local oscillator.

4. In combination, a thermionic valve, an input circuit for said valve, a local oscillator coupled to said input circuit and a rejector circuit tuned to the frequency of said local oscillator and located in said input circuit so that the oscillations from said local oscillator only effect the input to said valve.

G. H. CLARK.